HIGH TEMPERATURE RESISTOR

Filed Sept. 30, 1957

INVENTORS:
NATHAN SCHWARTZ,
FREDERICK G. KEIHN,
BY Charles W. Helzer
THEIR ATTORNEY.

United States Patent Office 2,967,282

Patented Jan. 3, 1961

2,967,282

HIGH TEMPERATURE RESISTOR

Nathan Schwartz and Frederick G. Keihn, North Syracuse, N.Y., assignors to General Electric Company, a corporation of New York Filed Sept. 30, 1957, Ser. No. 687,119

5 Claims. (Cl. 338—258)

Figure 1:
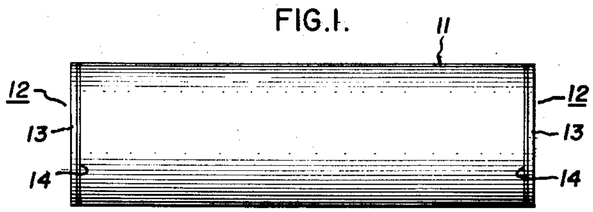

The present invention relates to the construction of new and improved electrical components for operation at high temperatures.

More particularly, the invention relates to new and improved high temperature resistors capable of operating in ambient temperatures of 500° centrigrade or better.

Recent developments in the manufacturing and packaging of electronic equipment, particularly military electronic equipment, have emphasized the need for some satisfactory solution to the problems presented by heat generated by the equipment during operation. Heretofore, it has been possible to solve this problem in many cases by housing the electronic equipment in specially cooled areas. This expedient of course necessitates the use of air-conditioning or other cooling machines which are both costly and increase the total weight requirements of the equipment in question. As an alternative solution, it is now possible to fabricate some electronic equipment out of electrical components which have been recently developed that are capable of operating in ambient temperatures of 500° centrigrade or better. Certain of these components for use in high temperature electronic equipment have been described in the past. For example, see United States patent application Serial No. 464,080 entitled "Conducting Films," J. E. Beggs, inventor, filed October 26, 1954, which discloses a high temperature resistors used therein exhibit positive temperature coeffi- 500° centrigrade or better. While these known high temperature resistors have been satisfactory, the resistance values obtainable with the known high temperature resistor structures have been limited to lower values of resistance. Hence, the number of high temperature electronic equipment that can be fabricated with such resistors is limited. Additionally, in some special purpose high temperature electronic equipment, it is desirable that the resistors used therein exhibit positive temperature coefficicients of resistance (i.e., the resistance of the resistor increases with increases in temperature).

It is therefore a primary object of the invention to provide new and improved high temperature resistors which are capable of operation in ambient temperatures of 500° centrigrade or better, and have relatively high resistance values.

Another object of the invention is to provide new and improved high temperature resistors having relatively high resistance values, and having positive temperature coefficients of resistance.

In practicing the invention, a resistor is provided which comprises a ceramic body having a resistive film formed thereon which is electrically connected to contacts secured to the ceramic body for providing terminal connections to the resistor. The resistive film comprises a layer of a reduced alkaline earth titanate selected from the group consisting essentially of strontium titanate, magnesium titanate, barium titanate or calcium titanate. It has been determined that resistors formed in this manner, may possess resistance values in the range of one kilohm to one megohm, and are capable of operating in ambient temperatures of 500° centrigrade or better. Further, it has been determined that high temperature resistors constructed by a resistance film formed by a properly reduced layer of strontium titanate exhibit positive temperature coefficients of resistance in the resistance range extending from 10 kilohms to one megohm.

Figure 2:
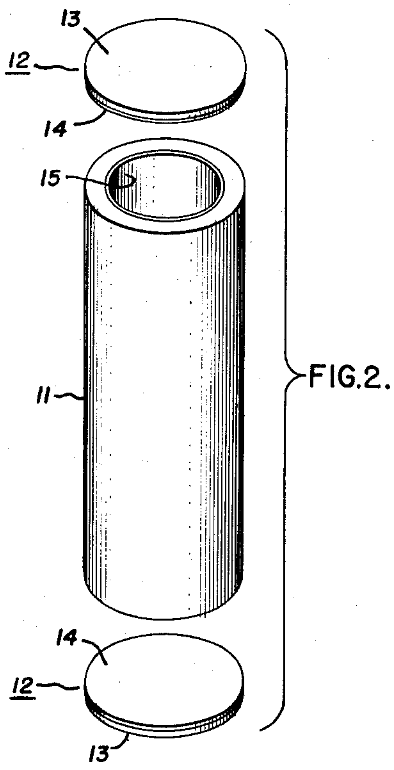

Other objects, features and many of the attendant advantages of this invention will be appreciated more readily as the same becomes better understood by reference to the following detailed description, when considered in connection with the accompanying drawing, wherein like parts in each of the several figures are identified by the same reference character, and wherein:

Fig. 1 is a side elevation view of a resistor constructed in accordance with the invention; and Fig. 2 is a perspective view of the resistor illustrated in Fig. 1 showing it in partially disassembled form.

The new and improved electrical resistor illustrated in Figs. 1 and 2 of the drawing is particularly designed for use in high ambient temperatures in the neighborhood of 500° centigrade or better. As best shown in Fig. 2 of the drawing, the resistor comprises an open-ended ceramic body 11 having the open ends thereof closed by metal end caps 12. The ceramic body 11 is formed from any of the known high temperature ceramic bodies, such as alumina, forsterite, or steatite, but preferably comprises alumina. The metal end caps 12 preferably comprise a laminated structure composed of a disc of titanium 13, and an annular nickel shim or disc 14.

The hollow ceramic body 11 has a resistance film, indicated at 15, formed on the interior surface thereof. The resistance film 15 comprises a layer of a reduced alkaline earth titanate selected from the group consisting essentially of magnesium titanate, strontium titanate, barium titanate, or calcium titanate. In manufacturing the resistor in accordance with the invention, the alkaline earth titanate ingredients are first chemically reduced in a separate operation. This is accomplished by heating the alkaline earth titanate to a sufficiently high temperature in a reducing atmosphere, and can be effected in any one of the following manners: (*a*) by reduction in a hydrogen atmosphere at a temperature in excess of 1200° centigrade, (*b*) by adding titanium hydride to the alkaline earth titanate, and firing the mixture in an inert or reducing atmosphere at temperatures in excess of 1200° centigrade, or by (*c*), addition of an active metal such as strontium, aluminum, and the like, to the alkaline earth titanate and firing the mixture in an inert or reducing atmosphere at temperatures in excess of 1200° centigrade.

The reduced alkaline earth titanate is then ground to a ceramically workable fineness. The grinding operation is preferably done under oil to prevent reoxidation of the reduced material, and the resulting slurry is then used to coat the interior surface of the ceramic body 11. After coating the interior surface of the hollow ceramic body 11 with the reduced alkaline earth titanate slurry, the metal end caps 12 are placed over the open ends of the hollow ceramic body, and the assembled resistor is placed in a suitable holding fixture. The entire assembly is then placed in a vacuum furnace and fired to a temperature in the neighborhood of 1050° centigrade in a vacuum of less than one micron, for example. This firing operation causes the interfaces of the laminated titanium-nickel discs 13 and 14, respectively, to melt, and form a ceramic-to-metal seal between the end caps and the annular end of the ceramic body 11, and results in hermetically sealing the interior of the ceramic body 11 from the atmosphere. While the end cap has been described as comprising two discs, one of titanium and the other of nickel, it is possible to fabricate the end cap from other materials. For example, in place of the titanium disc it is possible to use a disc of zirconium, hafnium, thorium, tantalum, or alloys thereof, and in place of the nickel shim it is possible to use a shim of iron, copper, cobalt, chromium, molybdenum, platinum, or alloys thereof in forming the ceramic-to-metal seal. For a more detailed description of the manner in which the ceramic-to-metal seal is formed, however, reference is made to co-pending United States patent application Serial No. 409,159 entitled "Metallic Bond," J. Beggs, inventor, filed February 9, 1954, now Patent No. 2,857,663.

In order to obtain resistance values from 10 kilohms to one megohm using the above-described technique of fabrication and geometry of the resistor, a relatively high value of resistivity (for example, $\frac{1}{10}$ to 1 ohm centimeters) must be obtained with the resistive film 15.

Additionally, for certain applications, it is desirable to obtain a resistive film having a positive temperature coefficient of resistance with as high a resistance value as is consistent with this requirement. Accordingly, in order to optimize the results of the invention, it was necessary to derive a method of measuring the resistivity of the high temperature resistive films.

Measurements of the resistivity of the resistive films were obtained using the following potentiometric method. In this method a bar of reduced alkaline earth titanate of uniform cross-section A is placed in series with a direct current source, and a constant known current I is established. A potentiometer is then used to measure the potential difference between one end of the bar and a movable probe. This potential difference is plotted as a function of the probe position along the sample. If the resistivity is independent of the probe position, and the cross-section A is uniform, the resulting curve is a straight line, the slope of which is the electric field E. The resistivity P can then be calculated from the equation $P=EA/I$. However, if the resistivity turns out to be a function of probe position, that is the resistivity appears to be dependent on the probe position along the sample, the potential difference versus position curve is not linear, and the resistivity P then is a function of the position of the probe, and can be obtained from the following equation $$P(x)=\frac{\left|\frac{dV}{dX}\right|}{I}A$$

where the $$\left|\frac{dV}{dX}\right|$$

is the magnitude of the slope at a given position.

Bars of reduced alkaline earth titanates measured with the above resistivity measurement method were prepared by mixing commercial lots of strontium titanate (obtained from National Lead Company) with hyform binder. The mixture was pressed into bars, and sintered at 1340° centigrade for one hour in an air atmosphere. This produced a bar which exhibited a porosity of 2% and a density of 4.63. Three bars of strontium titanate were prepared in this manner, and subsequently, were reduced in hydrogen at 1390° centigrade for 15 minutes, 60 minutes, and 140 minutes, respectively. A typical test specimen was then prepared from each of these three bars by slicing a transverse slab from the center of the bar. The slab was further reduced in size by additional parallel cuts which removed two outside surfaces. The resistivity of the resulting test specimen was measured as a function of the distance from the center of the slab to either end. Results are listed in the following table. The end values correspond to averages over small lengths near each end, and the center value corresponds to the resistivity averaged over a short distance about the center of the specimen.

| Bar | Resistivity (Ohm-Centimeters) | | |
|---|---|---|---|
| | End | Center | End |
| 15 min | .076 | .055 | .069 |
| 60 min | .055 | .045 | .056 |
| 140 min | .027 | .019 | .025 |

After exposure to air at room temperature for one week, the measurements of the same specimen were repeated and the following results obtained.

| Bar | Resistivity (Ohm-Centimeters) | | |
|---|---|---|---|
| | End | Center | End |
| 15 min | .071 | .054 | .066 |
| 60 min | .055 | .044 | .062 |
| 140 min | .046 | .032 | .037 |

From the above data it can be appreciated that the resistivity, and hence the magnitude of the resistance obtained in a resistor utilizing a reduced alkaline earth titanate resistive film is dependent upon the length of time that the alkaline earth titanate is left in a reducing atmosphere at high reducing temperatures. It has also been determined that the resistivity of the film is dependent on the thickness of the film, and upon the number and character of foreign ingredients in the raw alkaline earth titanates that are used in forming the reduced alkaline earth titanate resistive film materials. By controlling each of these factors, it is possible to produce resistors capable of operating in high ambient temperatures, and having any desired resistance value within the range of the resistance values from one kilohm to one megohm. Further, from an examination of the above data, it can be appreciated that very little reoxidation occurs with respect to the reduced alkaline earth titanate resistive film materials so that the resistivities obtainable therewith are not too greatly affected by exposure to the atmosphere. Hence elaborate measures are not required to protect against reoxidation of the reduced alkaline earth titanate materials prior to using them in fabricating resistive films in the above-described manner.

The temperature coefficient of resistance (TC) as used in this application is defined as $$TC=\frac{1}{R_0}\left(\frac{R-R_0}{T-T_0}\right)\times 100\%/C°.$$

where $R_0$ is the resistance at room temperature $T_0$ (25° centigrade), and R is the resistance at T° centigrade. The temperature coefficient as defined by the above equation is not a constant for resistors of the type herein described but depends upon temperature. In many applications, it is not important whether the temperature coefficient is positive or negative as long as the resistor exhibits a desired resistance value over the operating temperature range. In other applications, however, it is important that the high temperature resistor exhibit a positive temperature coefficient. It has been determined that in the case of reduced strontium titanate layers, where the layer has been reduced at temperatures above 1340° centigrade for a period of 20 minutes or more, these layers exhibit positive temperature coefficients. Accordingly, by the use of strontium titanate in forming the resistive film, and careful control of the reduction process, it is possible to obtain resistive films exhibiting positive temperature coefficients over the desired range of operating temperatures.

From the foregoing description, it can be appreciated that the invention provides new and improved high temperature resistors having resistance values lying within the range of one kilohm to one megohm, and capable of operating in ambient temperatures of 500° centigrade or better. Further, by proper selection of the material used in forming the resistive film of the high temperature resistor, and by careful control of the reduction process comprising a step in forming the resistive film, it is possible to obtain high temperature resistors having high values of resistance and exhibiting positive temperature coefficients of resistance over the desired range of operating temperatures.

Obviously, other modifications and variations of the present invention are possible in the light of the above teachings. It is therefore to be understood that changes may be made in the particular embodiments of the invention described which are within the full intended scope of the invention as defined by the appended claims.

What we claim as new and desire to secure by the Letters Patent of the United States is:

1. A high temperature resistor comprising a hollow open-ended evacuated ceramic body formed from a ceramic consisting essentially of a material selected from the group consisting of alumina, forsterite, and steatite, metal end caps secured over the open ends of said ceramic body by a ceramic-to-metal seal for sealing the hollow evacuated interior of said body closed to the atmosphere, said end caps being formed by a pair of laminated fused metal disc, one of the discs of the pair consisting essentially of a metal selected from the groups consisting of titanium, zirconium, hafnium, thorium, tantalum and alloys thereof, and the other of the discs consisting essentially of a metal selected from the groups consisting of nickel, iron, cobalt, copper, chromium, molybdenum, platinum and alloys thereof, and a resistive film formed on the interior of the hollow ceramic body and electrically connected to said metal end caps, said resistive film comprising a layer of a reduced alkaline earth titanate selected from the group consisting of strontium titanate, magnesium titanate, barium titanate and calcium titanate.

2. A high temperature resistor having a positive temperature coefficient of resistance comprising a hollow open-ended evacuated ceramic body formed of alumina, a metal end cap composed of laminated fused discs of titanium and nickel secured over the open ends of said ceramic body by a ceramic-to-metal seal for hermetically sealing the evacuated interior of the body closed to the atmosphere, and a resistive film having a positive temperature coefficient of resistance formed on the interior surface of the hollow ceramic body and electrically connected to said metal end caps, said resistive film comprising a layer of reduced strontium titanate.

3. A high ambient temperature range resistor having a positive temperature coefficient comprising a substantially hollow evacuated ceramic body, a resistive film formed on the interior surface of said ceramic body, said film comprising a layer of reduced strontium titanate, metal contacts composed of laminated fused discs providing a hermetic ceramic-to-metal seal with said ceramic body and making electrical contact with said film.

4. A resistor comprising an evacuated tubular ceramic body, metal contacts composed of laminated fused discs providing a hermetic ceramic-to-metal seal with said ceramic body, and a resistive film formed on the interior surface of the ceramic body and electrically connected to said contacts, said resistive film comprising a layer of reduced alkaline earth titanate selected from the group consisting of strontium titanate, magnesium titanate, barium titanate and calcium titanate.

5. A resistor having a positive temperature coefficient comprising an evacuated tubular ceramic body, metal contacts composed of laminated fused discs providing a hermetic ceramic-to-metal seal with said ceramic body, and a resistive film formed on the interior surface of the ceramic body and electrically connected to said contacts, said resistive film having a positive temperature coefficient and comprising a layer of reduced strontium titanate.

References Cited in the file of this patent

UNITED STATES PATENTS

| | | |
|---|---|---|
| 651,866 | Kitsee | June 19, 1900 |
| 1,291,106 | Payne | Jan. 14, 1919 |
| 1,506,852 | Morrison | Sept. 2, 1924 |
| 2,418,460 | Buehler | Apr. 8, 1947 |
| 2,475,756 | Peulet | July 12, 1949 |
| 2,496,346 | Haayman | Feb. 7, 1950 |
| 2,507,233 | Verwey | May 9, 1950 |
| 2,633,543 | Howatt | Mar. 31, 1953 |
| 2,686,274 | Rooksby | Aug. 10, 1954 |
| 2,695,380 | Mayer et al. | Nov. 23, 1954 |
| 2,857,663 | Beggs | Oct. 28, 1958 |

OTHER REFERENCES

"Metal Rectifier Developments," Hanisch, Electronic Engineering, pp. 313–315, October, 1946.